Patented Sept. 15, 1936

2,054,490

UNITED STATES PATENT OFFICE 2,054,490

CHROMIUM COMPLEX COMPOUNDS

Richard Stüsser, Cologne-Deutz, Germany, assignor to General Aniline Works, Inc., New York, N. Y., a corporation of Delaware No Drawing. Application June 26, 1934, Serial No. 732,537. In Germany February 2, 1932

2 Claims. (Cl. 260—12)

The present invention relates to new chromium complex compounds of 4-amino-1-hydroxybenzene-2-carboxylic acid and its nuclear substitution products, more particularly it relates to compounds which may be represented by the probable general formula:

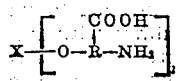

wherein R stands for a radical of the benzene series in which COOH stands in o-position and NH₂ in p-position to x—O—, and x stands for the group

in which group the Figure B stands for a non-diazotizable organic base, wherein the molecule may besides contain water, and wherein the benzene nucleus may bear further substituents, such as alkyl, alkoxy, the nitro group, halogen and the sulfonic acid group.

As non-diazotizable bases which may be present in my new complex compounds there may be mentioned by way of example primary, secondary and tertiary aliphatic bases and secondary and tertiary aromatic bases, such as ethylenediamine, dibutylamine, piperidine, tributylamine, ethyl- aniline, dimethylaniline, pyridine and quinoline.

My new chromium complex compounds containing a non-diazotizable organic base in the molecule are obtainable by treating the 4-amino-1-hydroxy-2-carboxylic acids or their water soluble salts in water or in an organic medium, such as alcohol, or in an aqueous organic medium, such as dilute aqueous alcohol, with a chromium salt of the kind referred to above and with the addition of a non-diazotizable base. Favorably the reaction is carried out with the application of heat, for example, by refluxing; however, the reaction may also be carried out at room temperature, for example, by stirring at room temperature for a prolonged time, say for several days.

In carrying out the invention care is to be taken that for one molecular proportion of 4-amino-1-hydroxybenzene-2-carboxylic acid at least one molecular proportion of the non-diazotizable base is present; generally, however, I am working with an excess of the non-diazotizable base.

The quantity of the chromium salt required for producing the new chromium complex compounds corresponds to ½ molecular equivalent proportion for 1 molecular proportion of the 4-amino-1-hydroxy-2-carboxylic acid. However, it should be mentioned that the process can be performed with excess chromium salt or with less than the theoretical quantity, in the former case the excess chromium remaining unconsumed in the reaction mass, while in the latter case only part of the 4-amino-1-hydroxybenzene-2-carboxylic acid being transformed into the chromium complex compound.

From the reaction mass the new chromium complex compounds containing chromium and the non-diazotizable base either wholly or partially separate in a crystalline form or remain in solution.

Those complex compounds free from water are in form of their alkali metal salts generally yellowish to brown substances, while those containing water generally are obtained in form of colorless to violet to weakly brownish substances.

From my present knowledge I cannot say that the constitution as stated above of the new complex compounds is correct; from the analysis of the chromium pyridine complex compounds containing water of 4-amino-1-hydroxybenzene-2-carboxylic acid however, it may be concluded that this compound corresponds to the following formula:

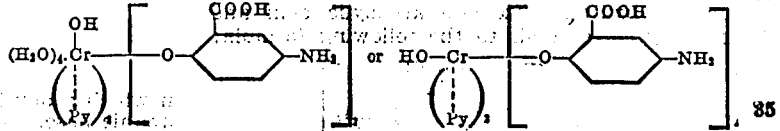

respectively, from which the general formulæ disclosed above would result.

The new chromium complex compounds are technically valuable products for the following reason: the 4-amino-1-hydroxybenzene-2-carboxylic acid and its nuclear substitution products yield diazo compounds which can be coupled with coupling components suitable for producing azodyestuffs. The energy of coupling of these diazo compounds, however, is so low that they only couple with components easily coupling. Thus, for example, up to the present it is not possible at all or only difficultly possible to couple the diazo compounds of 4-amino-1-hydroxybenzene-2-carboxylic acids with 2-hydroxynaphthalene-6,8-disulfonic acid, with 2-hydroxynaphthalene-4,8-disulfonic acid or with 2-hydroxynaphthalene-3,6-disulfonic acid, or with 2-hydroxynaphthalene-8-sulfonic acid, with salicylic acid or with cresotinic acid. Now I have found that the energy of coupling with diazo compounds of 4-amino-1-hydroxybenzene-2-carboxylic acid and its nuclear substitution products is highly increased when diazotizing the complex chromium compounds of the same obtainable in accordance with the present invention which complex compounds can be diazotized in the usual manner and coupled with coupling components suitable for producing azodyestuffs.

The invention is illustrated by the following examples, without being limited thereto:

Example 1.—230 grams of 4-amino-1-hydroxybenzene-2-carboxylic acid are refluxed for about three hours in 500 ccs. of water with 250 ccs. of pyridine and 250 grams of an aqueous chromium chloride solution of a strength corresponding to 270 grams of $Cr_2O_3$ in one litre. During the reaction a brownish-violet chromium-pyridine compound of the 4-amino-1-hydroxybenzene-2-carboxylic acid separates. When the reaction is complete, the new complex compound is filtered with suction, washed with water and dried. It is a crystalline substance of the molecular formula: $C_{24}$—$H_{31}$—$N_4$—$O_{11}$—$Cr$, and probably has the following constitution:

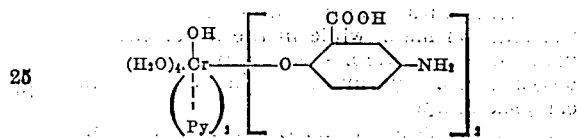

It can be diazotized in the usual manner, for example, with sodium nitrite and hydrochloric or sulfuric acid, yielding a reddish-brown crystalline diazo compound, easily soluble in water and coupling with coupling components to form azodyestuffs. The energy of coupling is highly increased compared with that of diazotized 4-amino-1-hydroxybenzene-2-carboxylic acid.

Example 2.—230 grams of 4-amino-1-hydroxybenzene-2-carboxylic acid are refluxed for about 2 hours in 500 ccs. of water with 400 ccs. of pyridine and 230 ccs. of aqueous chromium sulfate solution of a strength corresponding to 290 grams of $Cr_2O_3$ in one litre. In the course of the reaction a yellow substance separates, which is filtered with suction and dried after the reaction is complete. The yellow substance is the chromium pyridine complex compound of the 4-amino-1-hydroxybenzene-2-carboxylic acid and probably corresponds to the following formula:

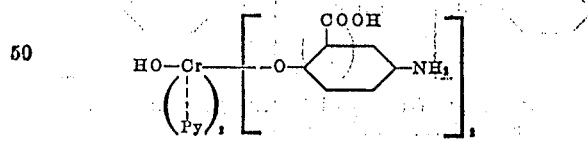

It is difficultly soluble in water, easily soluble in aqueous soda solution or in aqueous ammonia. It can be diazotized in the usual manner yielding a reddish-brown crystalline diazo compound, which is easily soluble in water and couples with coupling components to form azodyestuffs.

Example 3.—30 grams of 4-amino-6-methyl-1-hydroxybenzene-2-carboxylic acid are refluxed for about 3 hours in 40 ccs. of water with 40 ccs. of pyridine and 21 ccs. of an aqueous chromium chloride solution of a strength corresponding to 270 grams of $Cr_2O_3$ in one litre. In the course of the reaction a brownish crystalline mass separates. When the reaction is complete, the complex compound formed is filtered with suction, washed with water and dried. It has properties similar to those of the substance obtainable in accordance with Example 1.

Example 4.—35 grams of 6-sulfo-4-amino-1-hydroxybenzene-2-carboxylic acid are refluxed for about 3 hours in 50 ccs. of water with 30 ccs. of triethanolamine and 21 ccs. of an aqueous chromium sulfate solution of a strength corresponding to 290 grams of $Cr_2O_3$ in one litre. When the reaction is complete, the reaction mixture is allowed to cool, and the complex chromium-triethanol-6-sulfo-4-amino-1-hydroxybenzene-2-carboxylic acid compound formed is precipitated by salting out. After filtering and drying it is obtained as a greenish-grey substance, soluble in water and which can be diazotized in the usual manner.

Example 5.—1 molecular proportion of 4-amino-1-hydroxybenzene-2-carboxylic acid is heated in an autoclave for 3 hours at 110° C. with 150 ccs. of an aqueous chromium chloride solution, containing 270 grams of $Cr_2O_3$ in one litre, and 400 parts of an aqueous methylamine solution of 25% strength. After cooling a violet-brown solution is obtained to which ice is added. The solution is acidified with acetic acid, whereby a greyish-green precipitate is separated. After filtering with suction it is washed with water and dried on the air. The chromium-methylamine-4-amino-1-hydroxybenzene-2-carboxylic acid thus obtained is a greyish-green powder which can be diazotized with acetic acid and nitrite and which couples with coupling components.

This application is a continuation-in-part of application Ser. No. 653,927, filed January 27, 1933.

I claim:

1. As a new product, a compound selected from the group consisting of chromium complex compounds of the general formula:

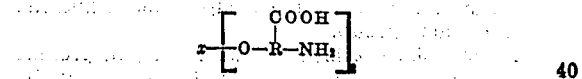

wherein R stands for a radical of the benzene series in which COOH stands in ortho-position and $NH_2$ in para-position to $x$—O—, and $x$ stands for the group

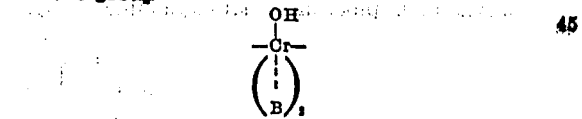

in which group B stands for a non-diazotizable organic base, and such derivatives thereof having water combined in the molecule.

2. As a new product the chromium complex compound of the formula:

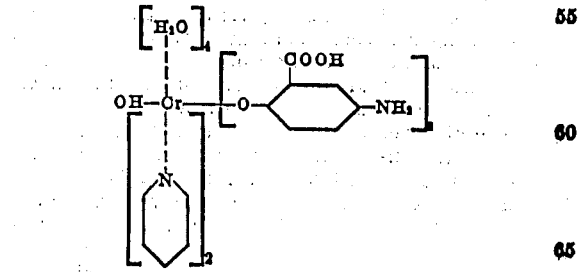

being a crystalline substance, yielding a reddish-brown crystalline diazo compound, easily soluble in water and coupling with coupling components to form azodyestuffs.

RICHARD STÜSSER.